United States Patent [19]
Schneider

[11] 3,918,498
[45] Nov. 11, 1975

[54] PRESSURE COMPENSATED HYDRAULIC ACCUMULATOR

[75] Inventor: William E. Schneider, Annapolis, Md.

[73] Assignee: The United States of America as represented by the Secretary of the Navy, Washington, D.C.

[22] Filed: Mar. 29, 1974

[21] Appl. No.: 456,085

[52] U.S. Cl. ............................................. 138/31
[51] Int. Cl.² ....................................... F16L 55/04
[58] Field of Search ..................................... 138/31

[56] References Cited
UNITED STATES PATENTS

| | | | |
|---|---|---|---|
| 359,315 | 3/1887 | Cregier | 138/31 |
| 2,764,999 | 10/1956 | Stanbury | 138/31 |
| 3,348,579 | 10/1967 | Swift et al. | 138/31 |
| 3,672,402 | 6/1972 | Bloemer | 138/31 |

FOREIGN PATENTS OR APPLICATIONS

| | | | |
|---|---|---|---|
| 757,865 | 10/1933 | France | 138/31 |
| 597,959 | 3/1954 | Canada | 138/31 |

*Primary Examiner*—Richard E. Aegerter
*Assistant Examiner*—Richard R. Stearns
*Attorney, Agent, or Firm*—Q. E. Hodges; R. S. Sciascia

[57] ABSTRACT

The invention is a means for referencing the line pressure of a deep submergence hydraulic system to ambient pressure while allowing a shock absorbing accumulator gas charge to be affected only by shock loads in the system lines and not by changes in ambient pressure. A series of piston defined pressure chambers balance the system reference pressure with the ambient pressure and permit only the operating pressure differentials of the system to affect the shock absorbing gas charge.

1 Claim, 1 Drawing Figure

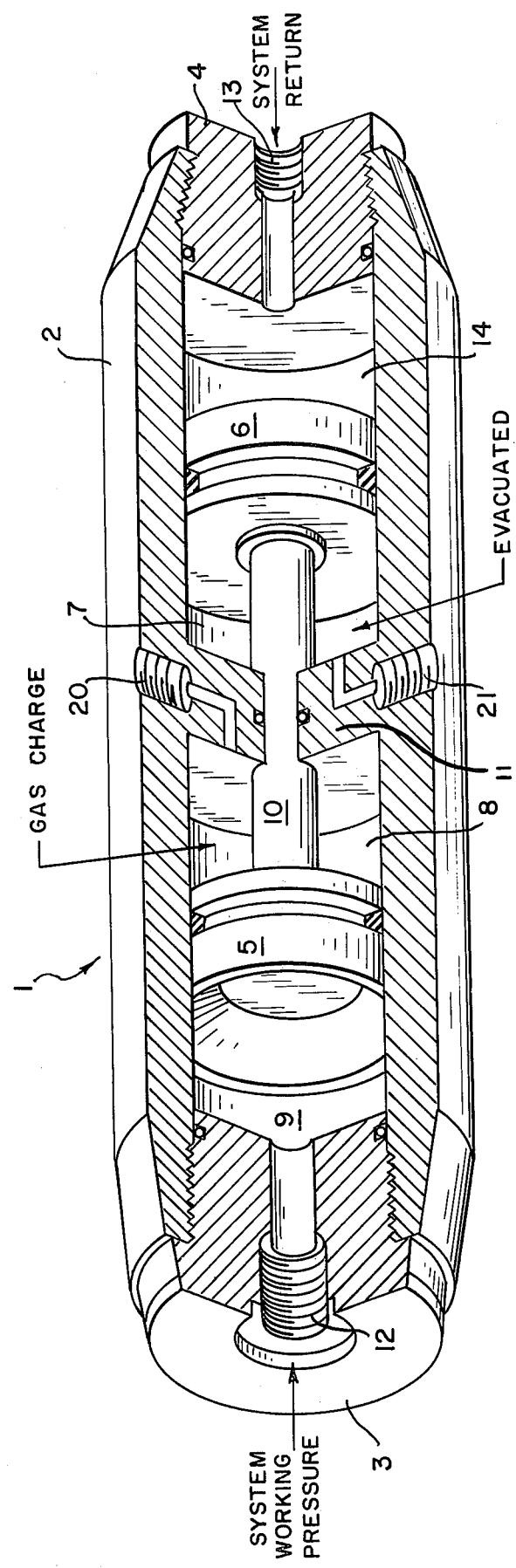

PRESSURE COMPENSATED HYDRAULIC ACCUMULATOR

The invention described in this specification may be manufactured and used by or for the Government of the United States of America for governmental purposes without the payment of royalties thereon or therefore.

BACKGROUND OF THE INVENTION

Hydraulic systems that are referenced to an ambient pressure are affected by any change in the ambient pressure. Hydraulic systems for deep ocean equipment such as a submarine are often referenced to the ambient ocean pressure so that the system can be placed outside the pressure hull. Hydraulic accumulators are used in hydraulic systems to absorb any sudden increase in system pressure such as an impulse load. Standard hydraulic accumulators of the piston type use a gas charge to act as a shock absorber in the hydraulic system. A predetermined charge of gas is contained in a chamber on one side of a piston while the piston is being balanced on the other side by the hydraulic fluid at system pressure. When such an accumulator is used in a system that is referenced to a varying ambient pressure the volume of the gas charge decreases with an increase in ambient pressure. When this occurs the effectiveness of the accumulator decreases because the maximum shock that can be absorbed decreases with a decrease in the volume of the charge. Therefore, prior art accumulators were of limited utility when used in a deep submergence vessel where the hydraulic system is referenced to the ambient pressure.

SUMMARY OF THE INVENTION

This hydraulic accumulator cancels out the effect of increases in referenced ambient pressure on the shock absorbing charge of the hydraulic accumulator. The volume of the gas charge is affected only by changes in the operating pressure of the hydraulic system over the reference ambient pressure.

OBJECTS OF THE INVENTION

It is an object of this invention to provide a hydraulic accumulator for systems referenced to ambient pressure which is insensitive to changes in ambient pressure.

It is an object of this invention to provide a hydraulic accumulator as described above which is inexpensive to manufacture.

It is an object of this invention to provide a hydraulic accumulator which may be used in a high pressure hydraulic system which operates in standard atmospheric conditions.

Other objects, advantages and novel features of the invention will become apparent from the following detailed description of the invention when considered in conjunction with the accompanying drawings.

BRIEF DESCRIPTION OF THE DRAWINGS

The FIGURE is a sectional view of the hydraulic accumulator of this invention.

DESCRIPTION OF THE PREFERRED EMBODIMENT

As shown in the drawing the balancing hydraulic accumulator 1 consists of a cylindrical body 2 with first and second end caps 3 and 4 respectively. Pistons 5 and 6 are joined by rod 10 and move freely within the smooth bore of cylinder 2. Rod 10 is connected to pistons 5 and 6 and transmits force between the pistons. The rod passes through a partition 11 which divides cylinder 2. Seals between each of the above described elements and the cylinder 2 or partition 11 maintain the fluid integrity of each of the volumes formed by the elements of device. Four chambers are formed by pistons 5 and 6, partition 11, end caps 3 and 4 and cylinder 2. Chamber 9 which is formed by piston 5, end cap 3 and cylinder 2 is filled with hydraulic fluid. Chamber 9 communicates with the hydraulic system through port 12 in end cap 3. The pressure in the chamber is always equal to the working pressure of the hydraulic system. The working pressure is the ambient or base reference pressure plus the driving pressure which operates the elements of the hydraulic system. Chamber 8 is filled through port 20 with a gas charge at some predetermined pressure. The charge pressure is a function of the hydraulic system working pressure. Port 20 is sealed after chamber 8 is charged and it remains sealed throughout the operation of the system. Chambers 8 and 9 are essentially the operating members of a standard hydraulic accumulator. Piston 6, partition 11, and cylinder 2 form chamber 7 which is evacuated to a low pressure. Alternatively, chamber 7 may be at any pressure less than or equal to the least ambient pressure the system will encounter. Access to chamber 7 may be accomplished through port 21 which is sealed during operation. Chamber 14 is formed by piston 6, end cap 4, and cylinder 2. It is permitted to communicate, through port 13, with the reference pressure of the hydraulic system which is, in turn, the ambient pressure.

When a pressure pulse (a rapid rise in pressure) occurs in the hydraulic system, it is transmitted through port 12 to the accumulator. This pressure moves piston 5 to the right to compress the gas charge in chamber 8. The gas is compressible and therefore acts as a shock absorber to dampen the pressure pulse. This portion of the operation of the accumulator is similar to any standard piston hydraulic accumulator.

Port 13 and chamber 14 are connected to the return or low pressure portion of the hydraulic system. Such hydraulic systems, which operate in environments that vary in pressure over a large range, are usually referenced to the ambient pressure.

As piston 5 moves to compress the gas charge in chamber 8 it also transmits motion through rod 10 to piston 6. If the area of pistons 5 and 6 are the same, chamber 14 is at the ambient pressure, and chamber 9 is at ambient plus system working pressure, then a long term increase in ambient pressure will have no affect on the volume or shock damping capacity of the gas charge. Chamber 7 is evacuated and therefore applies no force to piston 6. The pressures acting on the pistons then are the gas charge of chamber 8 and the ambient plus system pressure in chamber 9 and the ambient pressure of chamber 14. The effects of ambient pressure changes in the external system (not shown), applied in chambers 9 and 14 therefore act to cancel each other. The accumulator action of the system hydraulic pressure in chamber 9, acting against the gas charge of chamber 8, is therefore independent of any change in ambient pressure.

The accumulator of this invention is insensitive to changes in ambient pressure. Unlike its predecessors the volume and shock damping ability of the gas charge is not changed by changes in ambient pressure. To perform the function of the instant invention prior art accumulators would have to be adapted to have the gas charge volume change instantly and automatically as the ambient pressure changes. Complex and expensive hydraulic equipment would be necessary to accomplish this result. The instant invention accomplishes the stated objective with a simple and uncomplicated device. In a deep submergence device referencing the hydraulic system to the ambient pressure permits substantial weight and cost savings. The savings occur because the system can be mounted outside of the pressure hull. It is then only necessary that the hardware of the system be able to withstand the pressure differential of the operating hydraulic system pressure and the base pressure of the system.

Obviously many modifications and variations of the present invention are possible in the light of the above teachings. It is therefore to be understood that within the scope of the appended claims the invention may be practiced otherwise than as specifically described.

What is claimed is:

1. A hydraulic accumulator with shock absorbing ability responsive only to changes in the working pressure of a hydraulic system comprising:
   a first chamber containing hydraulic fluid which is at the ambient plus the working pressure of the hydraulic system;
   a second chamber filled with a gas charge of fixed amount;
   a first movable partition physically separating said first and second chambers;
   a third chamber evacuated of substantially all gas pressure;
   a fixed partition separating said second and said third chambers;
   a fourth chamber containing hydraulic fluid which is at the ambient reference pressure of the hydraulic system;
   a second movable partition having the same surface area as said first movable partition separating said third and fourth chambers; and
   means rigidly connecting said first and second movable partitions to transmit force therebetween.

* * * * *